United States Patent
Horn et al.

(10) Patent No.: US 12,047,874 B2
(45) Date of Patent: Jul. 23, 2024

(54) DYNAMIC CODE BLOCK MAPPING FOR WIRELESS COMMUNICATIONS

(71) Applicant: QUALCOMM Incorporated, San Diego, CA (US)

(72) Inventors: Idan Michael Horn, Hod Hasharon (IL); Michael Levitsky, Rehovot (IL); Daniel Paz, Geva Carmel (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/239,341

(22) Filed: Apr. 23, 2021

(65) Prior Publication Data
US 2022/0346005 A1  Oct. 27, 2022

(51) Int. Cl.
*H04W 72/12* (2023.01)
*H04L 27/26* (2006.01)
*H04W 52/02* (2009.01)

(52) U.S. Cl.
CPC ..... *H04W 52/0209* (2013.01); *H04L 27/2649* (2013.01); *H04W 72/12* (2013.01)

(58) Field of Classification Search
CPC .............. H04W 52/0209; H04W 72/12; H04L 27/2649; H04L 5/0016; H04L 5/0096; H04L 27/2634; Y02D 30/70
See application file for complete search history.

(56) References Cited

U.S. PATENT DOCUMENTS

| | | | |
|---|---|---|---|
| 5,159,282 A * | 10/1992 | Serizawa | H04L 27/00 329/316 |
| 10,511,405 B2 | 12/2019 | Yerramalli et al. | |
| 10,931,321 B1 * | 2/2021 | Ericson | H04B 1/109 |
| 2005/0113143 A1 | 5/2005 | Oiwa | |
| 2006/0234628 A1 * | 10/2006 | Horiguchi | H04L 5/006 455/39 |
| 2006/0285607 A1 * | 12/2006 | Strodtbeck | H04B 7/18582 375/261 |
| 2007/0058741 A1 * | 3/2007 | Inagawa | H04L 27/3488 375/332 |
| 2007/0216988 A1 | 9/2007 | Caplan | |
| 2008/0092022 A1 | 4/2008 | Karam | |
| 2008/0192925 A1 * | 8/2008 | Sachs | H04W 12/033 380/29 |
| 2008/0301534 A1 * | 12/2008 | Zheng | H04B 7/15521 714/752 |
| 2010/0202386 A1 * | 8/2010 | Takaoka | H04L 1/0083 370/329 |

(Continued)

*Primary Examiner* — Atique Ahmed
(74) *Attorney, Agent, or Firm* — Seyfarth Shaw LLP (57) ABSTRACT

A method of wireless communication by a user equipment (UE) includes reporting, to a base station, a requested downlink code block mapping, which has a defined duration. The method also includes receiving a first code block from the base station during the defined period of time. The method further includes receiving a second code block from the base station during the period of time. The method further includes decoding the first code block with a first demodulator according to the code block mapping. The method still further includes decoding the second code block with a second demodulator, which is different from the first demodulator, according to the code block mapping.

26 Claims, 6 Drawing Sheets

(56) References Cited

U.S. PATENT DOCUMENTS

| | | | |
|---|---|---|---|
| 2012/0155888 A1* | 6/2012 | Ji | G02B 6/305 398/182 |
| 2013/0301758 A1* | 11/2013 | Reial | H04L 25/03286 375/340 |
| 2014/0269627 A1 | 9/2014 | Gorokhov et al. | |
| 2016/0013897 A1* | 1/2016 | Sun | H04L 27/2607 370/312 |
| 2017/0311294 A1* | 10/2017 | Kim | H04L 1/00 |
| 2018/0131464 A1* | 5/2018 | Olofsson | H04L 1/0023 |
| 2018/0175981 A1* | 6/2018 | Manolakos | H04L 5/0046 |
| 2018/0278324 A1* | 9/2018 | Qin | H04B 7/18526 |
| 2019/0132087 A1* | 5/2019 | Wu | H04L 1/1671 |
| 2020/0092047 A1* | 3/2020 | Yeo | H04W 72/23 |
| 2020/0136783 A1* | 4/2020 | Takeda | H04L 5/0055 |
| 2020/0322070 A1* | 10/2020 | Zhang | H04L 25/0212 |
| 2021/0112538 A1* | 4/2021 | Kim | H04L 1/04 |

\* cited by examiner

DYNAMIC CODE BLOCK MAPPING FOR WIRELESS COMMUNICATIONS

FIELD OF THE DISCLOSURE

The present disclosure relates generally to wireless communications, and more specifically to dynamic code block mapping for improving user equipment (UE) power consumption.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes reporting, to a base station, a requested downlink code block mapping, which has a duration defined as a specific period of time. The method further includes receiving a first code block and a second code block from the base station during the defined period of time. The method includes decoding the first code block with a first demodulator and the second code block with a second demodulator according to the code block mapping. The second demodulator is different from the first demodulator.

In other aspects of the present disclosure, a method of wireless communication by a base station includes transmitting a downlink code block mapping, which has a duration defined for a period of time. The method further includes transmitting code blocks according to the code block mapping during the defined period of time.

In other aspects of the present disclosure, an apparatus for wireless communication by a user equipment (UE) includes a memory and at least one processor coupled to the memory. The processor(s) is configured to report, to a base station, a requested downlink code block mapping. The code block mapping has a duration of a specified period of time. The processor(s) is further configured to receive a first code block from the base station during the defined period of time, and a second code block from the base station during the defined period of time. The processor(s) is also configured to decode the first code block with a first demodulator and the second code block with a second demodulator, according to the code block mapping. The second demodulator is different from the first demodulator.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A challenge of wireless communication is reducing power consumption of UEs. Along with antenna elements, downstream radio frequency (RF) processing components consume power, such as analog-to-digital converters (ADCs), digital-front-end (DFE) components, and baseband processing components. Different demodulation techniques are available at the baseband for decoding downlink data received from the base station in data chunks, referred to as code blocks. Each demodulation technique has a different complexity, and as a result, affects power consumption differently.

Aspects of the present disclosure propose different code block mappings. Each code block mapping maps code blocks to a desired demodulator. As a result, the most power efficient demodulator may be used for each code block. The code block mapping improves decisions of which demodulator to employ, per code block. Consequently, UE power consumption is reduced. In some aspects, the UE transmits reports for code block mapping and the base station signals indications of a change in the code block mapping.

In some aspects of the present disclosure, at connection establishment, a UE may report to the base station (e.g., gNB) a list of possible demodulators supported by the UE. For each possible supported demodulator, the UE may also report performance metrics of the demodulator. With this knowledge, the base station may estimate the best code block mapping for improved UE power efficiency.

In other aspects of the present disclosure, the UE may report a desired code block mapping along with a time duration during which to apply the mapping. The time duration may be defined by a period of time, such as the next X number of slots. The desired code block mapping may optimize the demodulator for each code block. In some aspects, the code block mapping is with respect to frequency domain or time domain. In other aspects, the code block mapping is with respect to spatial layers. The code block mapping may indicate start and end boundaries of each code block. The mapping may indicate start and end boundaries for only a single code block or for several code blocks.

In order to reduce the size of the code block mapping report, predefined mappings may be indicated. According to aspects of the present disclosure, the UE may report the actually used demodulator for a code block. With this information, the base station may map resource elements (REs) and/or optimize transmission rates for each code block. In some aspects, the base station may decide to change a rate or power level of each code block according to the UE demodulator performance report. In this case, the base station notifies the UE of the change.

The reported code block mapping may be based on an estimated number of code blocks used for the next transmissions. The estimate may be based on information about the last slot or may be indicated from the base station.

The UE may report the code block mapping with radio resource control (RRC) messages, the physical uplink shared channel (PUSCH), uplink control information (UCI), or by a channel state feedback (CSF) report (or any combination of these messages). According to aspects of the present disclosure, the UE may trigger a request for a change in the code block mapping.

According to aspects of the present disclosure, the UE may demodulate the code blocks according to their probability to pass a cyclic redundancy check (CRC).

According to other aspects of the present disclosure, the base station may dynamically indicate a code block mapping. For example, the base station may indicate, to the UE, the configured code block mapping for a particular time duration, such as the next X number of slots. The number of slots to apply the code block mapping may be a predefined integer. In other implementations, the number of slots to apply the code block mapping may be reported by the base station. The base station may determine a configured code block mapping according to a UE code block mapping report or a UE performance report.

Advantages of the techniques of the present disclosure include improvement of UE demodulator and decoder power consumption. Other advantages include smart code block mapping in bands with high bandwidths, such as sub-THz frequencies including frequency range four (FR4) and frequency range five (FR5). The code block mapping report may be beneficial for higher frequencies (such as sub-THz—FR4, FR5) due to the high expected bandwidth that increases the need for dynamic time domain or frequency domain code block mapping.

Figure 1:
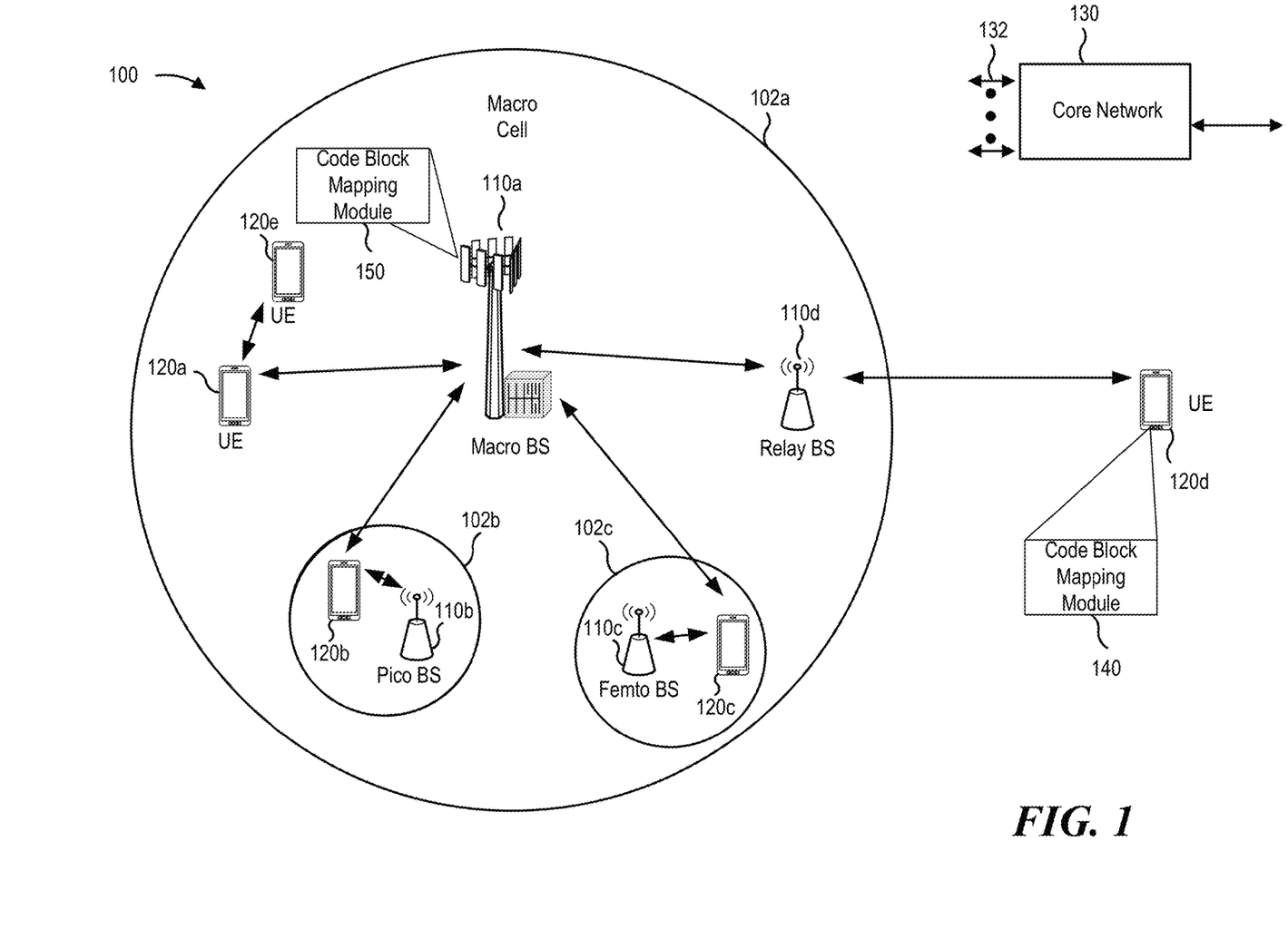
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a code block mapping module 140. For brevity, only one UE 120*d* is shown as including the code block mapping module 140. The code block mapping module 140 may report, to a base station, a requested downlink code block mapping, which has a defined duration. The module 140 may also receive a first code block and a second code block from the base station during the defined period of time. The module 140 may decode the first code block with a first demodulator and decode the second code block with a second demodulator, according to the code block mapping.

The base stations 110 may include a code block mapping module 150. For brevity, only one base station 110*a* is shown as including the code block mapping module 150. The code block mapping module 150 may transmit a downlink code block mapping, which has a duration defined by a period of time. The module 150 may further transmit code blocks according to the code block mapping during the defined period of time.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
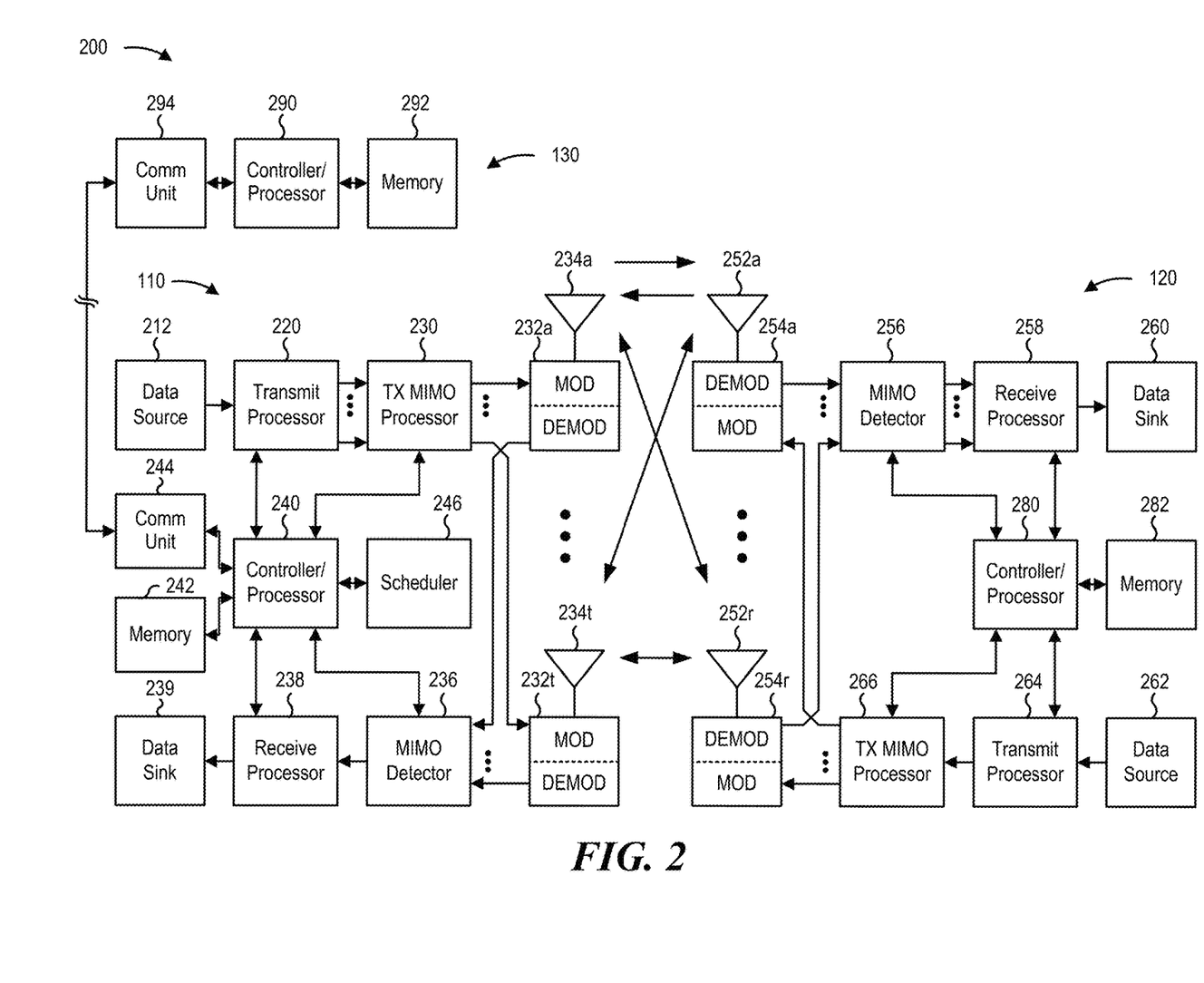
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with dynamic code block mapping, as described in more detail elsewhere. For example, the controller/processor 240 of the base station 110, the controller/processor 280 of the UE 120, and/or any other component(s) of FIG. 2 may perform or direct operations of, for example, the processes of FIGS. 5 and 6 and/or other processes as described. Memories 242 and 282 may store data and program codes for the base station 110 and UE 120, respectively. A scheduler 246 may schedule UEs for data transmission on the downlink and/or uplink.

In some aspects, the UE 120 or base station 110 may include means for reporting, means for receiving, means for decoding, means for generating, means for indicating, means for modifying, and means for transmitting. Such means may include one or more components of the UE 120 or base station 110 described in connection with FIG. 2.

As indicated above, FIG. 2 is provided merely as an example. Other examples may differ from what is described with regard to FIG. 2.

Reducing UE power consumption continues to be a challenge for wireless communications. Along with antenna elements downstream radio frequency (RF) processing components consume power. The downstream RF processing components include analog-to-digital converters (ADCs), digital-front-end (DFE) components and baseband processing components. It may be desirable to improve UE power consumption. Still, reducing UE power consumption continues to be a challenge for wireless communications.

For example, radio frequency integrated circuit (RFIC) power efficiency (e.g., bit per Joule) may be improved by employing multiple antennas to increase a number of spatial layers for transmitting and receiving multiple signal streams. Increasing the number of spatial layers reduces power consumption due to the reuse of shared elements. When the number of spatial layers increases, however, more complex techniques at the baseband are specified to separate the signal streams, increasing the overall power consumption of the UE.

One example baseband technique employs a maximum likelihood (ML) estimator, which exponentially increases in complexity relative to the number of spatial layers. Due to the high complexity of the ML estimator, it is often not implemented and other sub-optimal solutions with a reduced search space are used instead. Other lower power solutions exist, such as minimum means square error (MMSE) or successive interference cancellation (SIC) MMSE, which have better performance results in some scenarios compared to the sub-optimal reduced search space solutions.

An optimal detector solution may include using all the demodulators in parallel or using the most powerful technique. This optimal solution consumes high power and will not be the most power efficient solution. A more power efficient solution may include dynamically choosing a demodulator for a group of resource elements (REs) according to a smart predictor.

Due to limitations of some estimators, it is not possible to use different demodulators inside a same code block (CB), thus limiting the predictor resolution to be per code block. For example, an MMSE SIC estimator's smallest working resolution is the size of a code block. To overcome this disadvantage, aspects of the present disclosure propose different code block mappings for mapping code blocks to the desired demodulator. As a result, the most power efficient demodulator may be used for each code block.

According to aspects of the present disclosure, UE and base station (e.g., gNB) code block mapping improves decisions for which demodulator to employ, per code block. Consequently, UE power consumption is reduced. In some aspects, the UE transmits reports and the base station signals indications of a change in the code block mapping, which may reduce UE power consumption. Advantages of the techniques of the present disclosure include improvement of UE demodulator and decoder power consumption. Additional advantages include smart code block mapping in bands with high bandwidths, such as sub-THz frequencies, including frequency range four (FR4) and frequency range five (FR5).

In some aspects of the present disclosure, a UE may generate and transmit reports related to dynamic code block mapping. For example, at connection establishment, a UE may report to the base station a list of possible demodulators supported by the UE. For each possible supported demodulator, the UE may also report the power consumption and performance per delay spread, Doppler spread, rank per channel condition number (or correlation), constellation, rate, etc. For example, the UE report may indicate support of two demodulators with a performance gap of 0 dB in additive white Gaussian noise (AWGN) vs. 1 dB in an environment with a 10 ns delay spread for rank four communications. The UE report may also indicate the first demodulator power consumption is 10 times a power consumption of the second demodulator with a 64 QAM (quadrature amplitude modulation) demodulation technique, at a 0.92 transmission rate. With this knowledge, in some aspects, the base station may estimate the best code block mapping for improved or even optimized UE power efficiency. The reported power consumption may also include a decoder's power consumption for each of various demodulators.

In other aspects of the present disclosure, the UE may report a desired code block mapping along with a time duration during which to apply the mapping. The time duration may be defined by a period of time, such as the next X number of slots. A large number of slots will reduce report size but will specify slow changes to the mapping. The report may be based on channel estimates, knowledge of the decoders' performance, etc.

The desired code block mapping may optimize the demodulator for each code block. In other words, each code block may have its desired demodulator where all the code block's corresponding REs have similar relevant properties. In some aspects, the code block mapping is with respect to frequency domain or time domain.

Figure 3A:
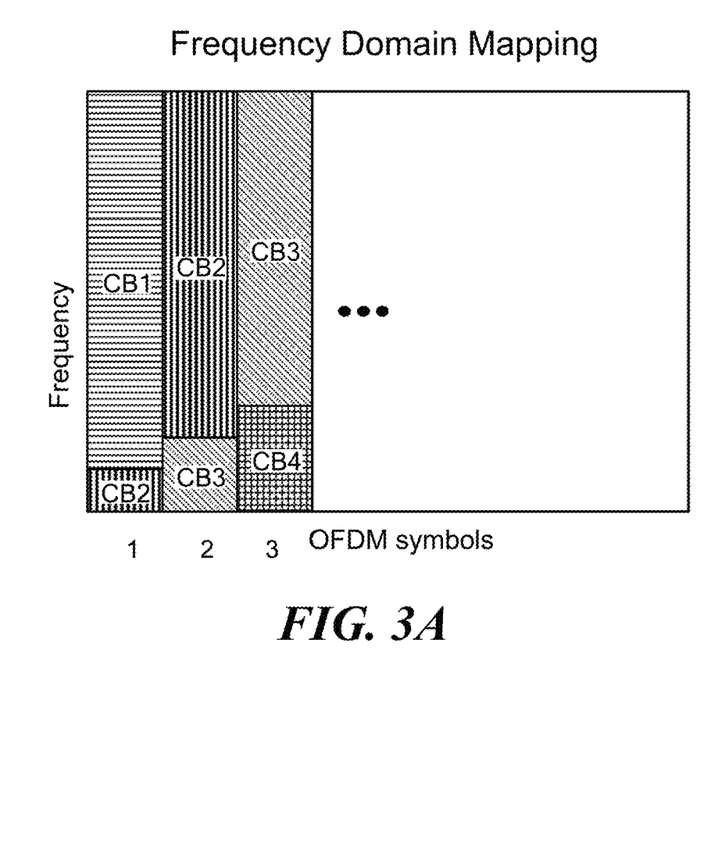
FIG. 3A is a diagram illustrating frequency domain mapping, in accordance with aspects of the present disclosure.

FIG. 3A is a diagram illustrating frequency domain mapping, in accordance with aspects of the present disclosure.

For frequency domain mapping, REs of each code block map to a particular set of frequencies, in a same symbol, or in multiple symbols, such as two consecutive symbols. In the example of FIG. 3A, a first code block (CB1) maps to a first set of frequencies in a first orthogonal frequency division multiplexing (OFDM) symbol (1). A second code block (CB2) maps to a second set of frequencies in the first symbol and a third set of frequencies in a second OFDM symbol (2). A third code block (CB3) maps to a fourth set of frequencies in the second symbol and a fifth set of frequencies in a third OFDM symbol (3). A fourth code block (CB4) maps to a sixth set of frequencies in the third OFDM symbol. According to aspects of the present disclosure, the UE reports a time duration, for example, two slots, for when to apply the mapping (e.g., the mapping of FIG. 3A). Accordingly, the code blocks are dynamically mapped in the frequency domain for the time duration. A single bit may be transmitted to indicate if the code blocks are frequency domain mapped. The indication may be via downlink control information (DCI) or a media access control (MAC) control element (CE), for example. The indication may apply to the current slot or a next slot (or later slot).

Figure 3B:
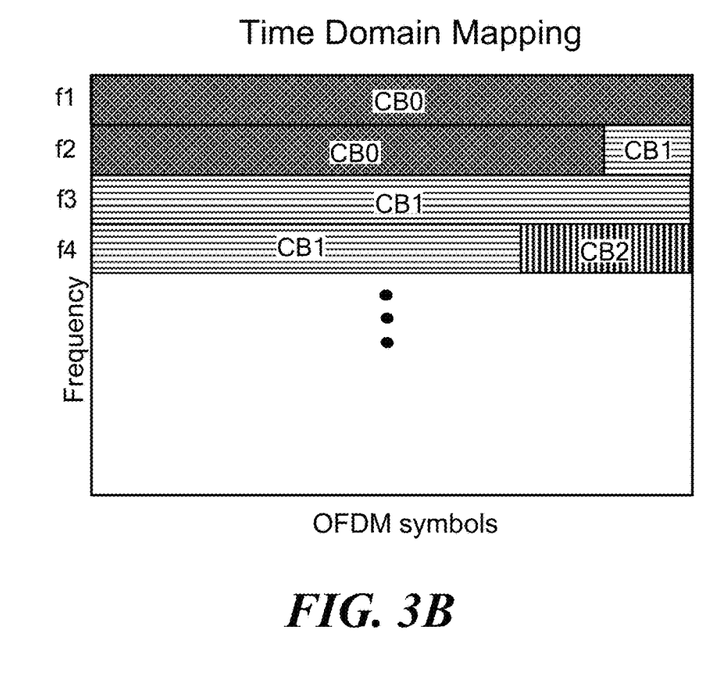
FIG. 3B is a diagram illustrating time domain mapping, in accordance with aspects of the present disclosure.

FIG. 3B is a diagram illustrating time domain mapping, in accordance with aspects of the present disclosure. Time domain mapping may be used for highly dispersive channels. In the example of FIG. 3B, an initial first code block (CB0) maps to a first frequency f1 during a first set of OFDM symbols and a second frequency f2 during a second set of OFDM symbols. A first code block (CB1) maps to the second frequency f2 during a third set of OFDM symbols, a third frequency f3 during a fourth set of OFDM symbols, and a fourth frequency f4 during a fifth set of OFDM symbols. A second code block (CB2) maps to the fourth frequency f4 during a sixth set of OFDM symbols. According to aspects of the present disclosure, the UE reports a time duration, for example, three slots, for when to apply the mapping (e.g., the mapping of FIG. 3B). Thus, the code blocks are dynamically mapped in the time domain for the time duration. A single bit may be transmitted to indicate if the code blocks are time domain mapped. The indication may be via DCI or a media access control (MAC) control element (CE), for example. The indication may apply to the current slot, a next slot, or a later slot.

Figure 4:
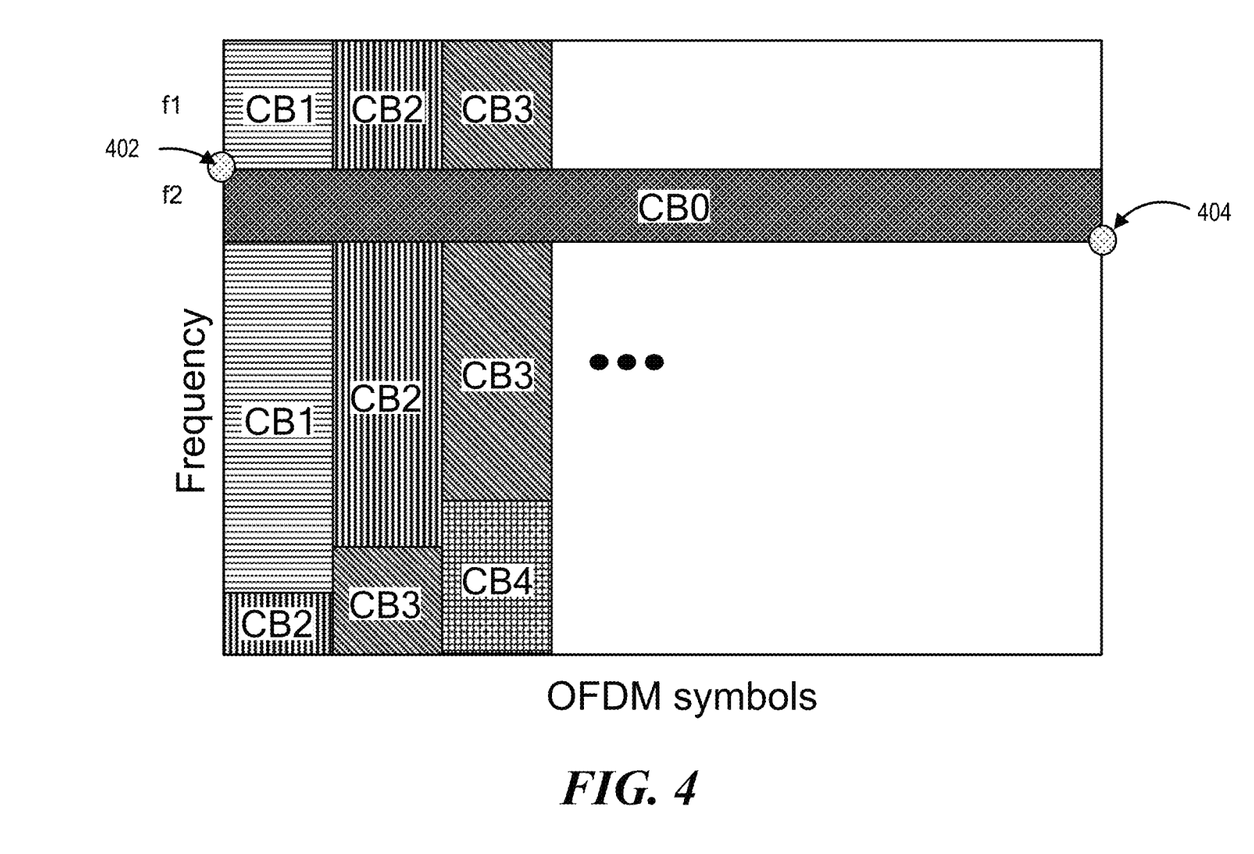
FIG. 4 is a diagram illustrating dynamic code block (CB) mapping, in accordance with aspects of the present disclosure.

In some examples, the code blocks may be time domain mapped for a first set of slots and then frequency domain mapped for a next set of slots. In other examples, some code blocks (e.g., code blocks one though four) are frequency division duplexed (FDD) and other code blocks (e.g., a single code block) are time division multiplexed (TDD). FIG. 4 is a diagram illustrating dynamic code block (CB) mapping, in accordance with aspects of the present disclosure. In this example, the base station configures four code blocks in the frequency domain and configures one code block in the time domain, for example, due to channel fading, channel spurs, etc. In FIG. 4, a first code block (CB1) maps to a first set of non-contiguous frequencies in a first OFDM symbol. A second code block (CB2) maps to a second set of frequencies in the first symbol and a second set of non-contiguous frequencies in a second OFDM symbol. A third code block (CB3) maps to a third set of frequencies in the second symbol and a fourth set of non-contiguous frequencies in a third OFDM symbol. A fourth code block (CB4) maps to a fourth set of frequencies in the third OFDM symbol. An initial code block (CB0) is mapped in the time domain to a frequency (f2) across a set of symbols (in the example of FIG. 4, all symbols).

In other aspects of the present disclosure, the code block mapping is with respect to spatial layers. The mapping may be for each spatial layer or for all layers. Currently, each code block is mapped to all layers. According to aspects of the present disclosure, in environments with highly correlated spatial layers, a more power efficient method maps each code block to a different layer. As a result, more REs may be used in each code block. In some aspects, code block mapping may be applied on a partial number of layers.

The code block mapping may indicate start and end boundaries of each code block. In other aspects, the mapping indicates start and end boundaries for a single code block or for several code blocks. FIG. 4 shows a start boundary 402 and an end boundary 404 for the initial code block (CB0). The boundaries may be reported in combination with other features, such as spatial layers, or a time/frequency domain mapping.

The overhead of a dynamic code block report depends on the complexity of the configuration. For simple configurations, such as mapping for one to two code blocks, the maximum number of bits required is one bit for time domain or frequency domain, one bit for code block per layer, and a product of log 2 (number of resource blocks (RBs)) (maximum of 8 bits) and two (for the starting point and ending point of the code block) (e.g., log 2 (number of RBs)*2). The sum of these values is a maximum of 18 bits for one code block mapping and (16*number of code blocks+2) for a higher number of code blocks. Of course, this is an upper bound and can be reduced. For example, the report may merely indicate an RB to start, including resources in time domain on all symbols until the code block is fully mapped.

For relatively simple code block mapping strategies (e.g., the mapping shown in FIG. 4), it may be assumed the UE reports a desired code block mapping and the base station can signal if the base station's allocation follows the UE recommendation. The base station signaling may be in DCI, for example. Thus, control overhead is reduced when the base station follows the UE recommendation.

In order to reduce the size of the code block mapping report, predefined mappings may be indicated. The mappings may be indicated according to allocation size, number of physical downlink shared channel (PDSCH) symbols, code block size, and number of code blocks, for example. In some example implementations, the UE may propose mapping a code block to a first frequency if the code block is in a first size range or a second frequency if the code block size is in a different range. The base station selects the frequency based on the actual code block size to be transmitted.

According to aspects of the present disclosure, the UE may report the actually used demodulator for a code block. With this information, the base station may map REs and/or optimize transmission rates for each code block. In some aspects, the base station may decide to change a rate or power level of each code block according to the UE demodulator performance report. In this case, the base station notifies the UE of the change.

The reported code block mapping may be based on an estimated number of code blocks used for the next transmissions. The estimate may be based on information about the last slot or may be indicated from the base station. If requested, the UE may report the code block mapping based on a predefined (or default) transport block (TB) size or a predefined (or default) resource allocation. In this case, the base station adjusts the mapping for an actual TB size or resource allocation. For example, if the UE bases its report on 40 RBs but only 30 RBs will actually be sent, the base station will adjust the mapping accordingly. In other aspects, the base station signals the next slot's TB size or resource allocation and the UE bases its report on this information.

The UE may report the code block mapping with radio resource control (RRC) messages, the physical uplink shared channel (PUSCH), uplink control information (UCI) or by a channel state feedback (CSF) report (or any combination of these messages). The code block mapping report may be beneficial for higher frequencies (such as sub-THz—FR4, FR5) due to the high expected bandwidth that increases the need for dynamic time domain or frequency domain code block mapping.

According to aspects of the present disclosure, the UE may trigger a request for a change in the code block mapping. If any change occurs, the UE may request for a new code block mapping. The appropriateness for a specific code block mapping may change over time. The mapping change may result from a change in the channel dispersiveness, the Doppler spread, a change in the rank used, or a change in the rank reported for the channel condition. The mapping may also change in response to a handover or beam change.

According to aspects of the present disclosure, the UE may demodulate the code blocks according to their probability to pass a cyclic redundancy check (CRC). For example, code blocks identified to be difficult may be decoded first and if one code block does not pass CRC, the rest of the code blocks are not decoded, saving power. In other examples, code blocks identified to be decoded with low demodulator power consumption may be decoded initially due to their low power. Any of the above combinations can be used.

According to aspects of the present disclosure, the base station may dynamically indicate a code block mapping. For example, the base station may indicate to the UE the configured code block mapping for a particular time duration, such as the next X number of slots. The base station may transmit the report in an RRC message, a MAC-CE message, DCI, or some combination of these messages. The report may be transmitted by RRC messages, for example, in case the number of slots slowly changes. The number of slots to apply the code block mapping may be a predefined integer. In other implementations, the number of slots to apply the code block mapping may be reported by one of the above specified report methods. A large value of X will reduce report size and will assume slow changes.

The base station may determine a configured code block mapping according to a UE code block mapping report or a UE performance report. Performance metrics that may affect the mapping include a change in the channel dispersiveness measured on the UE sounding reference signal (SRS), assuming channel reciprocity. Other performance metrics include a UE rank indication (RI) request, a signal to interference plus noise ratio (SINR), a reference signal received power (RSRP) reported from the UE, or any other parameter reported from the UE. Still, other metrics affecting the configured code block mapping may include a change in the UE allocation or in the MCS, handover or beam change, or a UE battery status report.

As indicated above, FIGS. 3A, 3B, and 4 are provided as examples. Other examples may differ from what is described with respect to FIGS. 3A, 3B, and 4.

Figure 5:
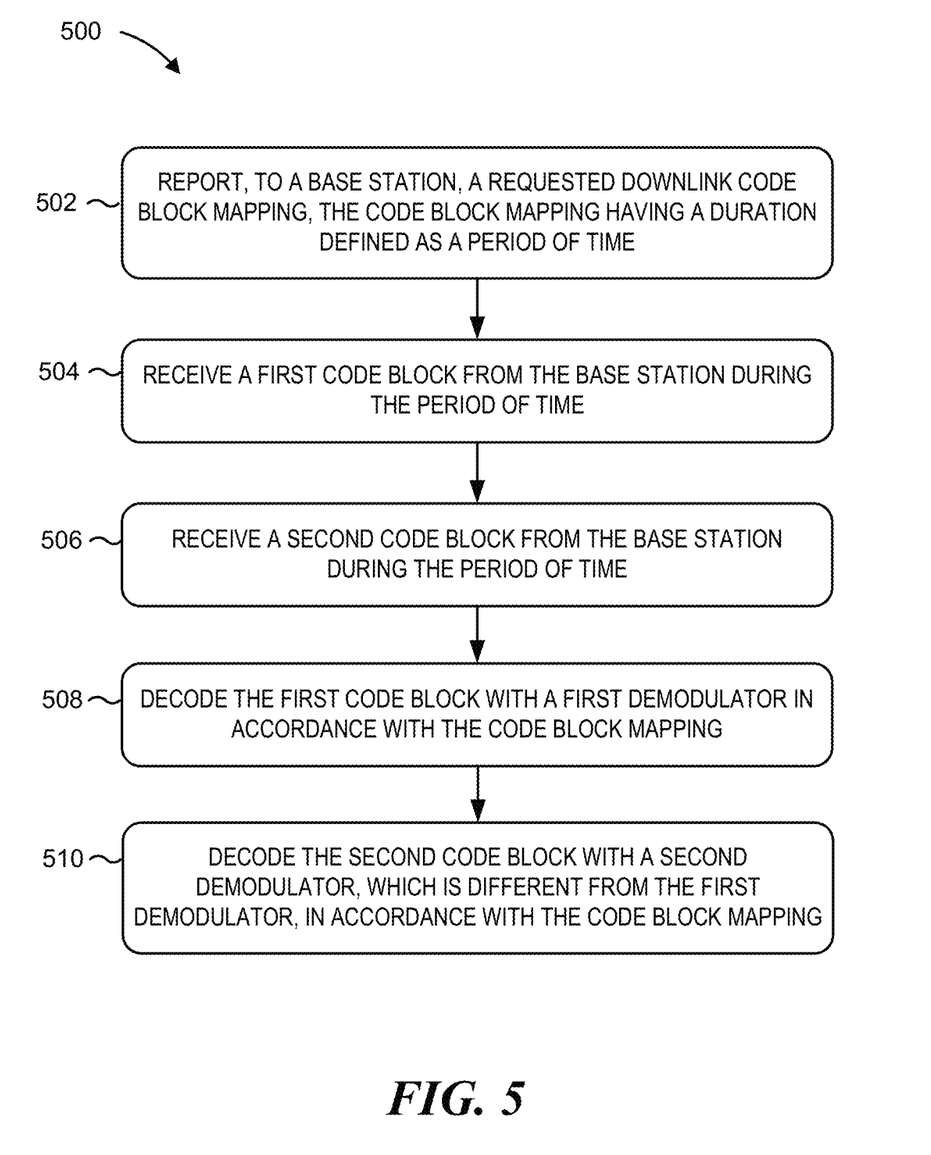
FIG. 5 is a flow diagram illustrating an example process performed, for example, by a user equipment (UE), in accordance with various aspects of the present disclosure.

FIG. 5 is a flow diagram illustrating an example process 500 performed, for example, by a UE, in accordance with various aspects of the present disclosure. The example process 500 is an example of an improved method of wireless communication by a user equipment (UE). The operations of the process 500 may be implemented by a UE 120.

At block 502, the user equipment (UE) reports, to a base station, a requested downlink code block mapping, the code block mapping having a duration defined as a period of time. For example, the UE (e.g., using the antenna 252, modulator (MOD) 254, transmit processor 264, TX multiple-input multiple-output (MIMO) processor 266, controller/processor 280, memory 282, and/or the like) may report the requested downlink code block mapping. The UE may also report to the base station a list of demodulators supported by the UE along with a performance level for each demodulator in the list of demodulators. The period of time may be a quantity of slots for which the code block mapping applies. In some aspects, the UE receives an indication confirming the requested downlink code block mapping. The code block mapping may include a start boundary and an end boundary for at least one code block. In other aspects, the code block mapping may include multiple options according to allocation size, number of physical downlink shared channel (PDSCH) symbols, code block size and/or number of code blocks. The UE may generate the code block mapping based on a predefined transport block size and/or predefined allocation size.

At block 504, the UE receives a first code block from the base station during the period of time. For example, the UE (e.g., using the antenna 252, modulator (MOD) 254, receive processor 258, multiple-input multiple-output (MIMO) detector 256, controller/processor 280, memory 282, and/or the like) may receive the first code block. At block 506, the UE receives a second code block from the base station during the period of time. For example, the UE (e.g., using the antenna 252, modulator (MOD) 254, receive processor 258, multiple-input multiple-output (MIMO) processor 256, controller/processor 280, memory 282, and/or the like) may receive the second code block.

At block 508, the UE decodes the first code block with a first demodulator in accordance with the code block mapping. For example, the UE (e.g., using the controller/processor 280, memory 282, and/or the like) may decode the first code block. At block 510, the UE decodes the second code block with a second demodulator, which is different from the first demodulator, in accordance with the code block mapping. For example, the UE (e.g., using the controller/processor 280, memory 282, and/or the like) may decode the second code block. The first demodulator may be a frequency domain modulator, and the second demodulator may be a time domain modulator. In other aspects, the first demodulator corresponds to a first layer, and the second demodulator corresponds to a second layer different from the first layer.

Figure 6:
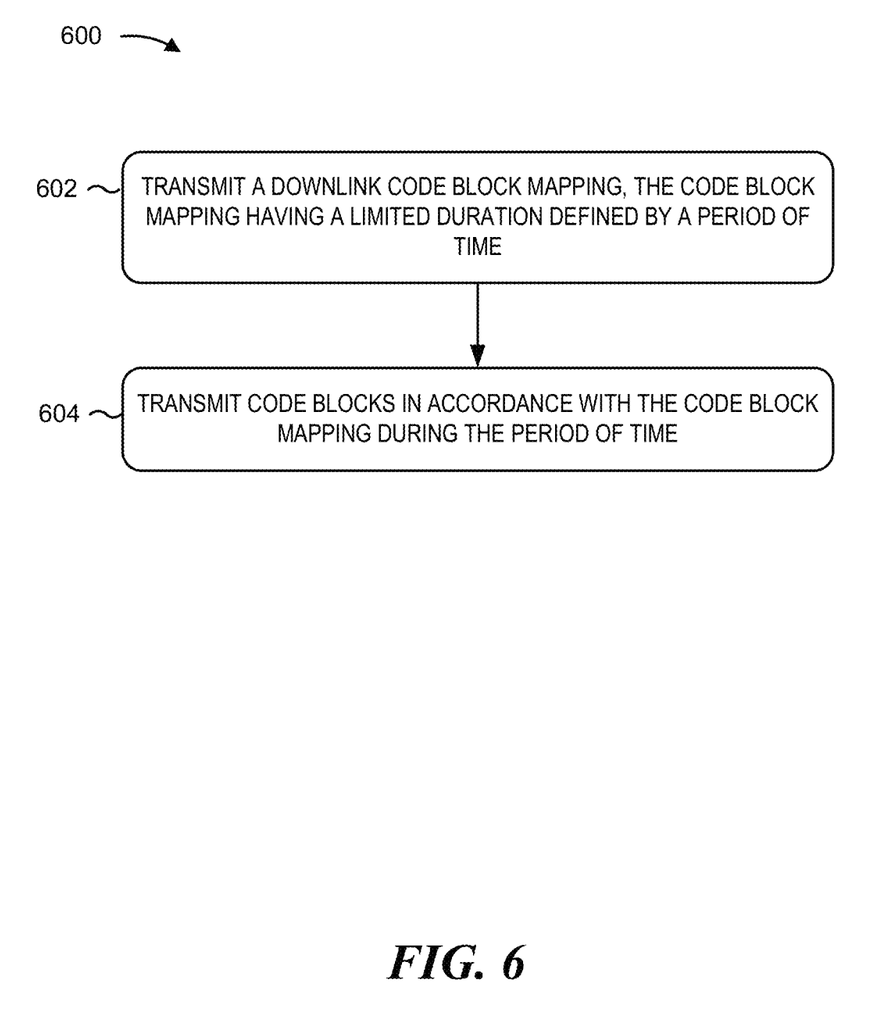
FIG. 6 is a flow diagram illustrating an example process performed, for example, by a base station, in accordance with various aspects of the present disclosure.

FIG. 6 is a flow diagram illustrating an example process 600 performed, for example, by a base station, in accordance with various aspects of the present disclosure. The example process 600 is an example of an improved method of wireless communication by a base station. The operations of the process 600 may be implemented by a base station 110.

At block 602, the base station transmits a downlink code block mapping, the code block mapping having a limited duration defined by a period of time. For example, the base station (e.g., using the antenna 234, modulator 232, TX MIMO processor 230, transmit processor 220, controller/processor 240, memory 242, and/or the like) may transmit the downlink code block mapping. The base station may also transmit an indication of the period of time for the code block mapping. In some aspects, the period of time is predefined. The base station may indicate a rate change and/or a power level change on a per code block basis. The code block mapping may indicate a set of code blocks are time domain or frequency domain mapped for the period of time. For example, the code block mapping may indicate individual code blocks are time domain or frequency domain mapped for the period of time. In some aspects, transmitting the code block mapping comprises transmitting an indication of accepting a requested code block mapping received from a user equipment (UE).

At block 604, the base station transmits code blocks in accordance with the code block mapping during the period of time. For example, the base station (e.g., using the antenna 234, modulator 232, TX MIMO processor 230, transmit processor 220, controller/processor 240, memory 242, and/or the like) may transmit the code blocks.

Implementation examples are described in the following numbered clauses.

1. A method of wireless communication by a user equipment (UE), comprising:
    reporting, to a base station, a requested downlink code block mapping, the code block mapping having a duration defined as a period of time;
    receiving a first code block from the base station during the period of time;
    receiving a second code block from the base station during the period of time;
    decoding the first code block with a first demodulator in accordance with the code block mapping; and
    decoding the second code block with a second demodulator, which is different from the first demodulator, in accordance with the code block mapping.
2. The method of clause 1, further comprising reporting to the base station a list of demodulators supported by the UE along with a performance level for each demodulator in the list of demodulators.
3. The method of clause 1 or 2, in which the period of time comprises a quantity of slots for which the code block mapping applies.
4. The method of any of the preceding clauses, in which the first demodulator comprises a frequency domain modulator, and the second demodulator comprises a time domain modulator.
5. The method of any of the preceding clauses, in which the first demodulator corresponds to a first layer, and the second demodulator corresponds to a second layer different from the first layer.
6. The method of any of the preceding clauses, further comprising receiving an indication confirming the requested downlink code block mapping.
7. The method of any of the preceding clauses, further comprising transmitting a request for a change to the requested downlink code block mapping.
8. The method of any of the preceding clauses, further comprising receiving an indication of a changed rate or changed power level of each code block based on UE demodulator performance.
9. The method of any of the preceding clauses, in which the code block mapping comprises a start boundary and an end boundary for at least one code block.
10. The method of any of the preceding clauses, in which the code block mapping comprises a plurality of options according to at least one of allocation size, number of physical downlink shared channel (PDSCH) symbols, code block size or number of code blocks.
11. The method of any of the preceding clauses, further comprising generating the code block mapping based on at least one of a predefined transport block size or predefined allocation size.
12. A method of wireless communication by a base station, comprising:
    transmitting a downlink code block mapping, the code block mapping having a limited duration defined by a period of time; and
    transmitting code blocks in accordance with the code block mapping during the period of time.
13. The method of clause 12, further comprising transmitting an indication of the period of time for the code block mapping.
14. The method of clause 12, in which the period of time is predefined.
15. The method of any of the clauses 12-14, further comprising indicating at least one of a rate change or a power level change on a per code block basis.
16. The method of any of the clauses 12-15, in which the code block mapping indicates a set of code blocks are time domain or frequency domain mapped for the period of time.
17. The method of any of the clauses 12-16, in which the code block mapping indicates individual code blocks are time domain or frequency domain mapped for the period of time.
18. The method of any of the clauses 12-17, in which transmitting the code block mapping comprises transmitting an indication of accepting a requested code block mapping received from a user equipment (UE).
19. The method of any of the clauses 12-18, further comprising generating the code block mapping based on a list of demodulators and associated performance data, received from a user equipment (UE).
20. The method of any of the clauses 12-19, further comprising generating the code block mapping based on a report from a user equipment (UE) indicating UE performance.
21. The method of any of the clauses 12-20, further comprising modifying a requested code block mapping received from a user equipment (UE) based on at least one of a difference between a predefined transport block size and an actual transport block size, or a difference between a predefined allocation size and an actual allocation size.
22. An apparatus for wireless communication by a user equipment (UE), comprising:
    a memory; and
    at least one processor coupled to the memory and configured:
        to report, to a base station, a requested downlink code block mapping, the code block mapping having a duration defined as a period of time;
        to receive a first code block from the base station during the period of time;
        to receive a second code block from the base station during the period of time;
        to decode the first code block with a first demodulator in accordance with the code block mapping; and
        to decode the second code block with a second demodulator, which is different from the first demodulator, in accordance with the code block mapping.
23. The apparatus of clause 22, in which the at least one processor is further configured to report to the base station a list of demodulators supported by the UE along with a performance level for each demodulator in the list of demodulators.

24. The apparatus of clause 22 or 23, in which the period of time comprises a quantity of slots for which the code block mapping applies.

25. The apparatus of any of the clauses 22-24, in which the first demodulator comprises a frequency domain modulator, and the second demodulator comprises a time domain modulator.

26. The apparatus of any of the clauses 22-25, in which the first demodulator corresponds to a first layer, and the second demodulator corresponds to a second layer different from the first layer.

27. The apparatus of any of the clauses 22-26, in which the at least one processor is further configured to receive an indication confirming the requested downlink code block mapping.

28. The apparatus of any of the clauses 22-27, in which the at least one processor is further configured to transmit a request for a change to the requested downlink code block mapping.

29. The apparatus of any of the clauses 22-28, in which the at least one processor is further configured to receive an indication of a changed rate or changed power level of each code block based on UE demodulator performance.

30. The apparatus of any of the clauses 22-29, in which the code block mapping comprises a start boundary and an end boundary for at least one code block.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   reporting, to a base station, a requested downlink code block mapping between demodulators and code blocks, wherein the code block mapping comprises a start boundary and an end boundary for a code block, one or more demodulators mapped to each code block, and a duration defined as a period of time;
   receiving a first code block from the base station during the period of time;
   receiving a second code block from the base station during the period of time;
   decoding the first code block with a first demodulator of the one or more demodulators in accordance with the code block mapping, wherein the first demodulator is selected to reduce power consumption by the UE; and
   decoding the second code block with a second demodulator of the one or more demodulators, which is different from the first demodulator, in accordance with the code block mapping, wherein the second demodulator is selected to reduce power consumption by the UE and wherein the first demodulator corresponds to a first spatial layer, and the second demodulator corresponds to a second spatial layer different from the first spatial layer.

2. The method of claim 1, further comprising reporting to the base station a list of demodulators supported by the UE along with a performance level for each demodulator in the list of demodulators.

3. The method of claim 1, in which the period of time comprises a quantity of slots for which the code block mapping applies.

4. The method of claim 1, in which the first demodulator comprises a frequency domain modulator, and the second demodulator comprises a time domain modulator.

5. The method of claim 1, further comprising receiving an indication confirming the requested downlink code block mapping.

6. The method of claim 1, further comprising transmitting a request for a change to the requested downlink code block mapping.

7. The method of claim 1, further comprising receiving an indication of a changed rate or changed power level of each code block based on UE demodulator performance.

8. The method of claim 1, in which the code block mapping comprises a plurality of options according to at least one of allocation size, number of physical downlink shared channel (PDSCH) symbols, code block size or number of code blocks.

9. The method of claim 1, further comprising generating the code block mapping based on at least one of a predefined transport block size or predefined allocation size.

10. A method of wireless communication by a base station, comprising:
transmitting a downlink code block mapping between demodulators and code blocks to a user equipment (UE) in response to a request from the UE, wherein the code block mapping comprises a limited duration defined by a period of time, a start boundary and an end boundary for a code block, and a first demodulator and a second demodulator each mapped to at least one code block, and wherein the first demodulator corresponds to a first spatial layer, and the second demodulator corresponds to a second spatial layer different from the first spatial layer; and
transmitting code blocks in accordance with the code block mapping during the period of time, wherein one or more demodulators are determined to reduce power consumption by the UE.

11. The method of claim 10, further comprising transmitting an indication of the period of time for the code block mapping.

12. The method of claim 10, in which the period of time is predefined.

13. The method of claim 10, further comprising indicating at least one of a rate change or a power level change on a per code block basis.

14. The method of claim 10, in which the code block mapping indicates a set of code blocks are time domain or frequency domain mapped for the period of time.

15. The method of claim 14, in which the code block mapping indicates individual code blocks are time domain or frequency domain mapped for the period of time.

16. The method of claim 10, in which transmitting the code block mapping comprises transmitting an indication of accepting a requested code block mapping received from a user equipment (UE).

17. The method of claim 10, further comprising generating the code block mapping based on the first demodulators and the second demodulator and associated performance data, received from a user equipment (UE).

18. The method of claim 10, further comprising generating the code block mapping based on a report from a user equipment (UE) indicating UE performance.

19. The method of claim 10, further comprising modifying a requested code block mapping received from a user equipment (UE) based on at least one of a difference between a predefined transport block size and an actual transport block size, or a difference between a predefined allocation size and an actual allocation size.

20. An apparatus for wireless communication by a user equipment (UE), comprising:
a memory; and
at least one processor coupled to the memory and configured:
to report, to a base station, a requested downlink code block mapping between demodulators and code blocks, wherein the code block mapping comprises at least a start boundary and an end boundary for a code block, one or more demodulators mapped to each code block, and a duration defined as a period of time;
to receive a first code block from the base station during the period of time;
to receive a second code block from the base station during the period of time;
to decode the first code block with a first demodulator in accordance with the code block mapping, wherein the first demodulator is selected to reduce power consumption by the UE; and
to decode the second code block with a second demodulator, which is different from the first demodulator, in accordance with the code block mapping, wherein the second demodulator is selected to reduce power consumption by the UE and wherein the first demodulator corresponds to a first spatial layer, and the second demodulator corresponds to a second spatial layer different from the first spatial layer.

21. The apparatus of claim 20, in which the at least one processor is further configured to report to the base station a list of demodulators supported by the UE along with a performance level for each demodulator in the list of demodulators.

22. The apparatus of claim 20, in which the period of time comprises a quantity of slots for which the code block mapping applies.

23. The apparatus of claim 20, in which the first demodulator comprises a frequency domain modulator, and the second demodulator comprises a time domain modulator.

24. The apparatus of claim 20, in which the at least one processor is further configured to receive an indication confirming the requested downlink code block mapping.

25. The apparatus of claim 20, in which the at least one processor is further configured to transmit a request for a change to the requested downlink code block mapping.

26. The apparatus of claim 20, in which the at least one processor is further configured to receive an indication of a changed rate or changed power level of each code block based on UE demodulator performance.

* * * * *